United States Patent
Kang et al.

(10) Patent No.: US 11,449,242 B2
(45) Date of Patent: Sep. 20, 2022

(54) SHARED STORAGE SPACE ACCESS METHOD, DEVICE AND SYSTEM AND STORAGE MEDIUM

(71) Applicant: Cambricon Technologies Corporation Limited, Beijing (CN)

(72) Inventors: Ping Kang, Beijing (CN); Yao Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 17/087,107

(22) Filed: Nov. 2, 2020

(65) Prior Publication Data
US 2021/0141545 A1 May 13, 2021

(30) Foreign Application Priority Data
Nov. 11, 2019 (CN) .......................... 201911092018.8

(51) Int. Cl.
*G06F 3/06* (2006.01)
(52) U.S. Cl.
CPC .......... *G06F 3/0622* (2013.01); *G06F 3/0659* (2013.01); *G06F 3/0676* (2013.01); *G06F 3/0677* (2013.01); *G06F 3/0679* (2013.01)
(58) Field of Classification Search
CPC .......... G06F 3/06–0689; G06F 3/0622; G06F 3/0659; G06F 3/0676; G06F 3/0677; G06F 3/0679
See application file for complete search history.

(56) References Cited

U.S. PATENT DOCUMENTS

| 9,652,385 B1* | 5/2017 | Chadwick | ............... G06F 9/528 |
| 2017/0068640 A1* | 3/2017 | Shahar | ................ H04L 67/1097 |
| 2019/0205244 A1* | 7/2019 | Smith | ...................... G06F 12/12 |

FOREIGN PATENT DOCUMENTS

| CN | 105487812 A | 4/2016 |
| CN | 106662980 A | 5/2017 |

OTHER PUBLICATIONS

CN 201911092018.8, Official Action dated Dec. 31, 2019, 7 pages. No English Translation.

* cited by examiner

*Primary Examiner* — Nicholas J Simonetti
(74) *Attorney, Agent, or Firm* — Getech Law LLC; Jun Ye

(57) ABSTRACT

The invention relates to a shared storage space access method, device and system and a storage medium. The product comprises a control module. The control module comprises an instruction cache unit, an instruction processing unit and a storage queue unit. The instruction caching unit is used for storing a calculation instruction associated with the artificial neural network operation; the instruction processing unit is used for analyzing the calculation instruction to obtain a plurality of operation instructions; the storage queue unit is used for storing an instruction queue, and the instruction queue comprises a plurality of operation instructions or calculation instructions to be executed according to the front-back sequence of the queue. Through the method or the product, the access efficiency of the storage space can be improved.

18 Claims, 12 Drawing Sheets

SHARED STORAGE SPACE ACCESS METHOD, DEVICE AND SYSTEM AND STORAGE MEDIUM

TECHNICAL FIELD

The present disclosure relates to the field of computer technologies, and in particular relates to a method, a device, a system, and a storage medium for accessing a shared storage space.

BACKGROUND

In a multi-core processor system, a plurality of cores usually need to cooperate to complete the same task. Therefore, the plurality of cores often read and write a shared memory space of the same address. In this case, how to ensure data consistency and improve the parallel operation efficiency of a multi-core processor has become an important issue for a multi-core processor system.

SUMMARY

Based on this, it is necessary to provide a method, a device, a system, and a storage medium for accessing a shared storage space aiming at the technical problems above.

According to an aspect of the present disclosure, a method for accessing a shared storage space is provided. The method is applied to a first unit. The first unit can access the shared storage space. The first unit is a processor or a core in a processor. The method includes:

sending a write request to a shared memory, where the write request carries an operator and a destination address, so that the shared memory can obtain an operand according to the destination address, use the operator to perform an operation on the operand to obtain an operation result, and write the operation result in the destination address.

According to another aspect of the present disclosure, a method for accessing a shared storage space is provided. The method is applied to a shared memory, and includes:

receiving a write request, where the write request carries an operator and a destination address; and obtaining an operand according to the destination address, using the operator to perform an operation on the operand to obtain an operation result, and writing the operation result to the destination address.

According to an aspect of the present disclosure, a system is provided. The system includes: a first unit and a shared memory.

The first unit can access the shared storage space, and the first unit is a processor or a core in a processor. The first unit is configured to send a write request to the shared memory, where the write request carries an operator and a destination address.

The shared memory is configured to receive the write request, obtain an operand according to the destination address, use the operator to perform an operation on the operand to obtain an operation result, and write the operation result in the destination address.

According to another aspect of the present disclosure, a device for accessing a shared storage space is provided. The device is applied to a first unit. The first unit can access the shared storage space. The first unit is a processor or a core in a processor. The device includes:

a first sending module configured to send a write request to the shared memory. The write request carries an operator and a destination address, so that the shared memory can obtain an operand according to the destination address, use the operator to perform an operation on the operand to obtain an operation result, and write the operation result in the destination address.

According to another aspect of the present disclosure, a device for accessing a shared storage space is provided. The device is applied to a shared memory. The device includes:

a second receiving module configured to receive a write request, where the write request carries an operator and a destination address; and an operation module configured to obtain an operand according to the destination address, use the operator to perform an operation on the operand to obtain an operation result, and write the operation result in the destination address.

According to an aspect of the present disclosure, a device for accessing a shared space is provided. The device includes:

a processor; and a memory configured to store a processor executable instruction.

The processor is configured to perform the above-mentioned method.

According to another aspect of the present disclosure, a non-volatile computer-readable storage medium is provided. A computer program instruction is stored in the storage medium. The computer program instruction implements the above-mentioned method when being executed by a processor.

By setting an operation unit in the shared memory to implement the operation process in the shared memory, an operand read in the shared memory does not need to be returned to the first unit (a processor or a processor core) in time, the shared memory can directly perform an operation on the operand to obtain an operation result and then write the result. The system provided by the present disclosure may help to simplify the interaction process so that most of the time spent in the data obtaining and writing stages can be saved, thereby reducing the execution delay of the read-modify-write process. In particular for a last level of shared storage space in a hierarchical shared memory, the access path for the first unit to access the last level of shared storage space may be very long. In this case, the effect of reducing the execution delay by using the system of the present disclosure may be more apparent.

Exemplary embodiments will be described in detail below with the accompanying drawings to make other features and aspects of the present disclosure clear.

BRIEF DESCRIPTION OF THE DRAWINGS

The drawings are included in the specification and constitute a part of the specification. Together with the specification, the drawings illustrate exemplary embodiments, features, and aspects of the present disclosure, and are used to explain the principles of the present disclosure.

DETAILED DESCRIPTION

Figure 1:
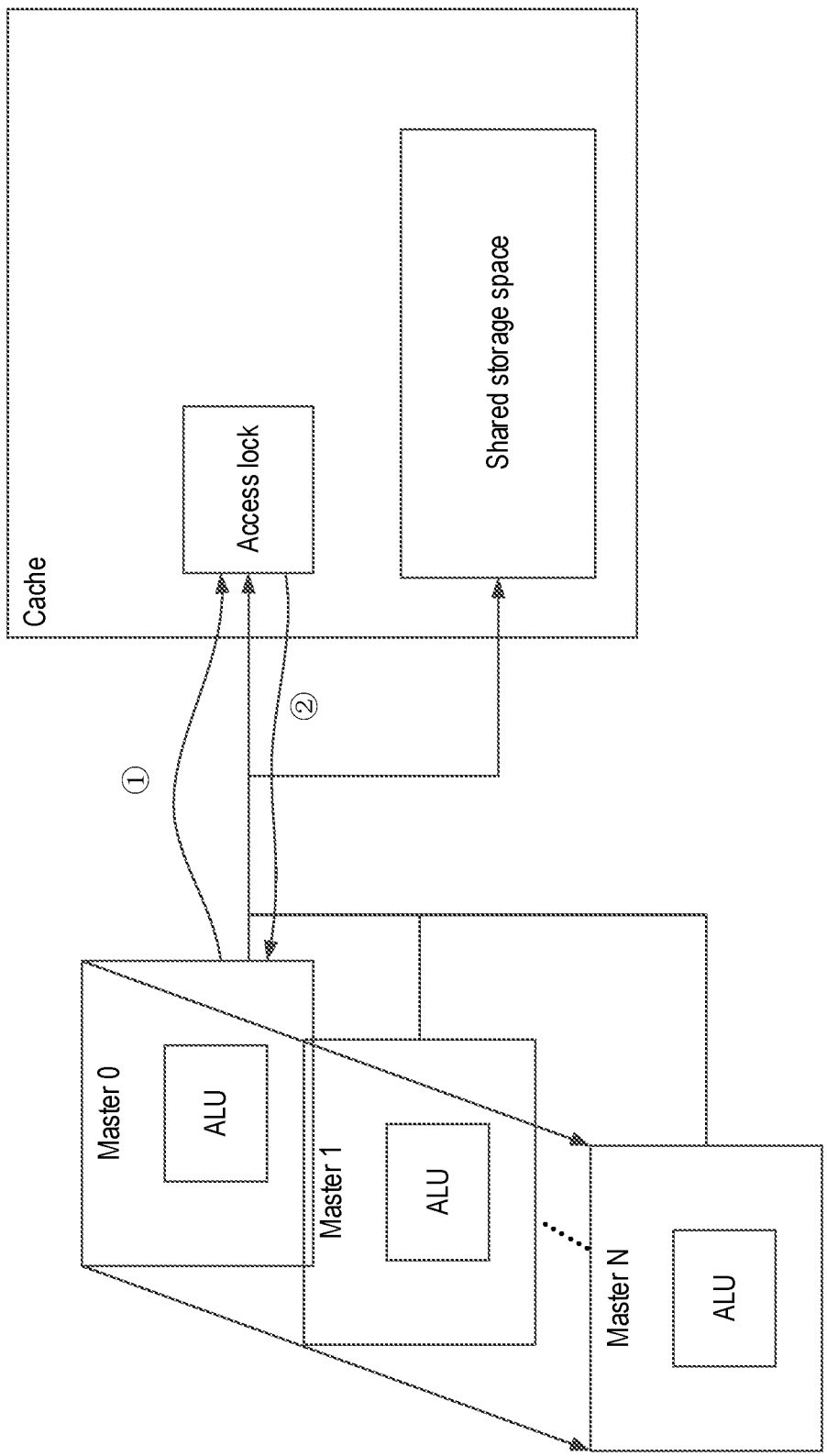
FIG. 1 shows a schematic diagram of a process of obtaining the control right of an access lock according to the related art.

Technical solutions in embodiments of the present disclosure will be described clearly and completely hereinafter with reference to the drawings in the embodiments of the present disclosure. Obviously, the embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in the claims, specification, and drawings are used for distinguishing different objects rather than describing a specific order. It should be understood that the terms "including" and "comprising" used in the specification and claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context. Similarly, depending on the context, the phrase "if it is determined that" or "if [a described condition or event] is detected" can be interpreted as "once it is determined that", or "in response to a determination", or "once [a described condition or event] is detected", or "in response to a case where [a described condition or event] is detected".

In a multi-core processor system, a plurality of cores usually need to cooperate to complete the same task. Therefore, the plurality of cores often read and write a shared memory space of the same address. In this case, how to ensure data consistency and improve the parallel operation efficiency of a multi-core processor has become an important issue for a multi-core processor system.

When a plurality of processors or a plurality of cores in a processor need to perform a read-modify-write operation on a shared memory space, a traditional implementation method is based on an access lock, that is, the system configures one access lock for each shared memory space (shared memory). When a master such as CPU, IPU, GPU or an external device is to access a shared storage space following the traditional method, the master needs to obtain the control right of a corresponding access lock first. After successfully obtaining the control right, the master can then perform a set of read-modify-write operations on the content in the shared storage space. A purpose of doing so is to maintain the consistency of data in the shared storage space and ensure there is no conflict when a plurality of masters access the shared storage.

Figure 2:
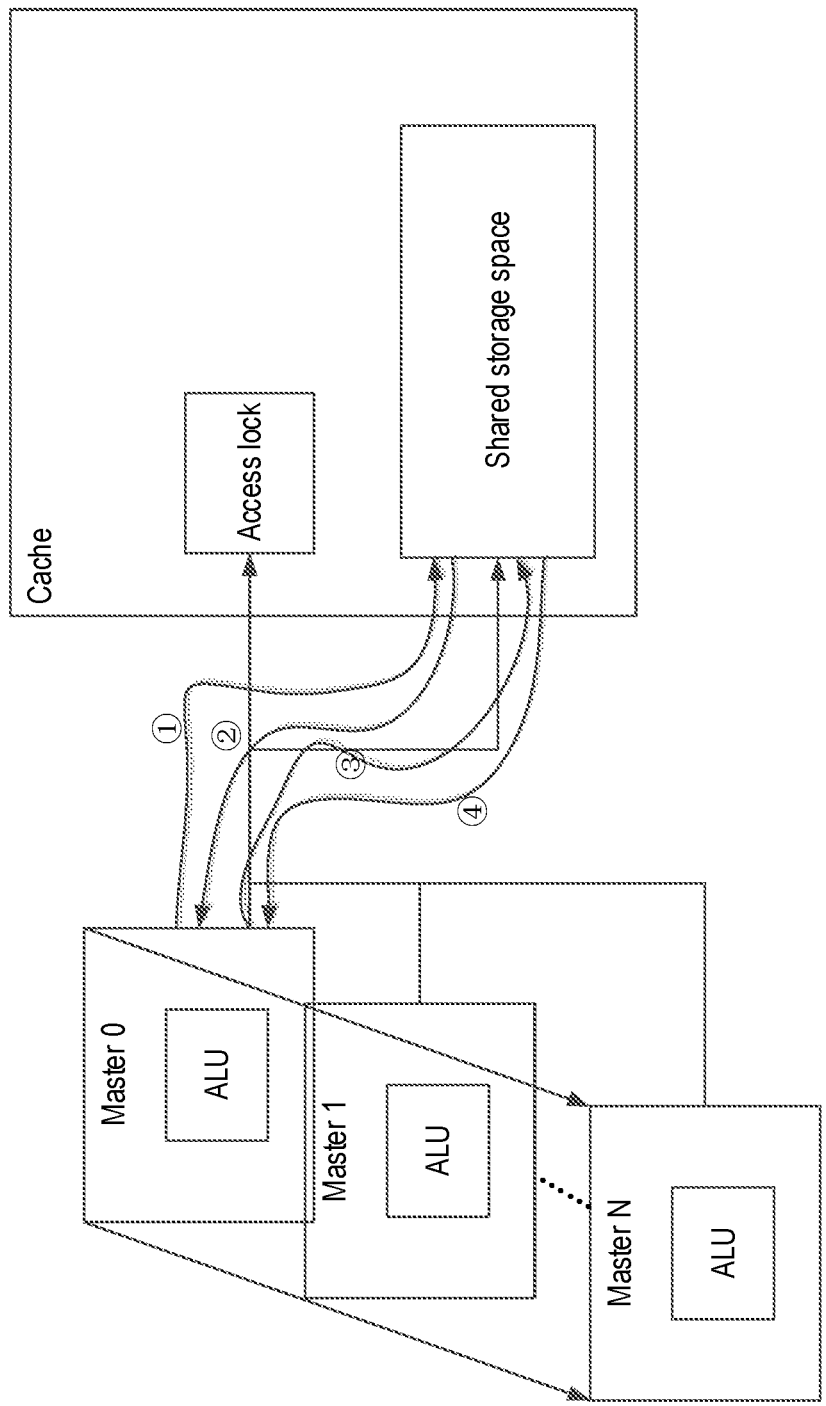
FIG. 2 shows a schematic diagram of a process of reading and writing a shared storage space according to the related art.

FIG. 1 shows a schematic diagram of a process of obtaining the control right of an access lock according to the related art. FIG. 2 shows a schematic diagram of a process of reading and writing a shared storage space according to the related art. For a specific process of a read-modify-write operation based on an access lock, see FIG. 1 and FIG. 2. As shown in FIG. 1, a first step of Master0 initiating a read-modify-write operation is: obtaining the control right of an access lock. The cache (a scratch pad memory) can be caches at all levels. Each master can access the shared storage space in the cache, or access an access locks library to obtain locks. Access locks library is a memory in which access locks are stored. Each lock has a corresponding segment of shared memory bar (space) (cache line). A process of obtaining the lock can be represented by the curves of the steps ① and ② shown in FIG. 1. Master0 first accesses the access locks, finds an access lock corresponding to a target shared memory bar, and then modifies the status of the access lock as occupied and returns the status of the access lock before the modification. If the status of the access lock before the modification shows that the access lock was not occupied, Master0 obtains the lock successfully; if the status of the access lock before the modification shows that the access lock was already occupied, Master0 fails to obtain the lock and needs to try obtaining the access lock again.

After obtaining the lock successfully, Master0 can access the target shared memory bar. There are four steps for Master0 to access the shared memory bar: ① obtain target data (the two steps ① and ② shown in FIG. 2); ② modify the data; ③ write the modified data to the same address in the shared storage space and at the same time modify the status of the corresponding access lock in the access locks as unoccupied (the step ③ in FIG. 2); ④ the cache responds to the write request (the step ④ in FIG. 2).

In the read-modify-write operation performed on the shared storage space, there are many ways to modify data during the "read+modify+write" process. The principle is to use obtained data as an operand for a certain operation, and then an obtained operation result serves as new data. In the traditional method, the process of modifying data is completed in a master, therefore, there is usually an operation unit in the master. The operation unit completes the process of data modifying. Taking an INC (increment plus) operation as an example:

$D=(A>=B)?0:A+1$ where A denotes obtained data, which serves as an operand of INC, B denotes another operand, D denotes an operation results, and finally the master writes D in the storage address of data A again.

The implementation method of the read-modify-write operation based on the access lock may have two obvious disadvantages:

① the master may have many operation procedures;
② when a data flow path between the master and the cache is long (the master has long delay when accessing the cache); if a plurality of masters initiate read-modify-write operations to the same shared memory bar, the shared memory bar can only be accessed in serial which leads to low efficiency.

In order to solve the above-mentioned technical problems, the present disclosure provides a system which may include: a first unit and a shared memory.

The first unit can access a shared storage space, and the first unit may be a unit that can actively initiate a request (for example, a write request or a read request) to the shared memory. For example, the first unit may send a write request to the shared memory, where the write request may carry an operator and a destination address.

The shared memory is configured to receive the write request, obtain an operand according to the destination address, use the operator to perform an operation on the operand to obtain an operation result, and write the operation result in the destination address.

The first unit and the shared memory may be located on the same chip and the shared memory may also be an off-chip memory, which is not limited in the present disclosure.

Figure 3:
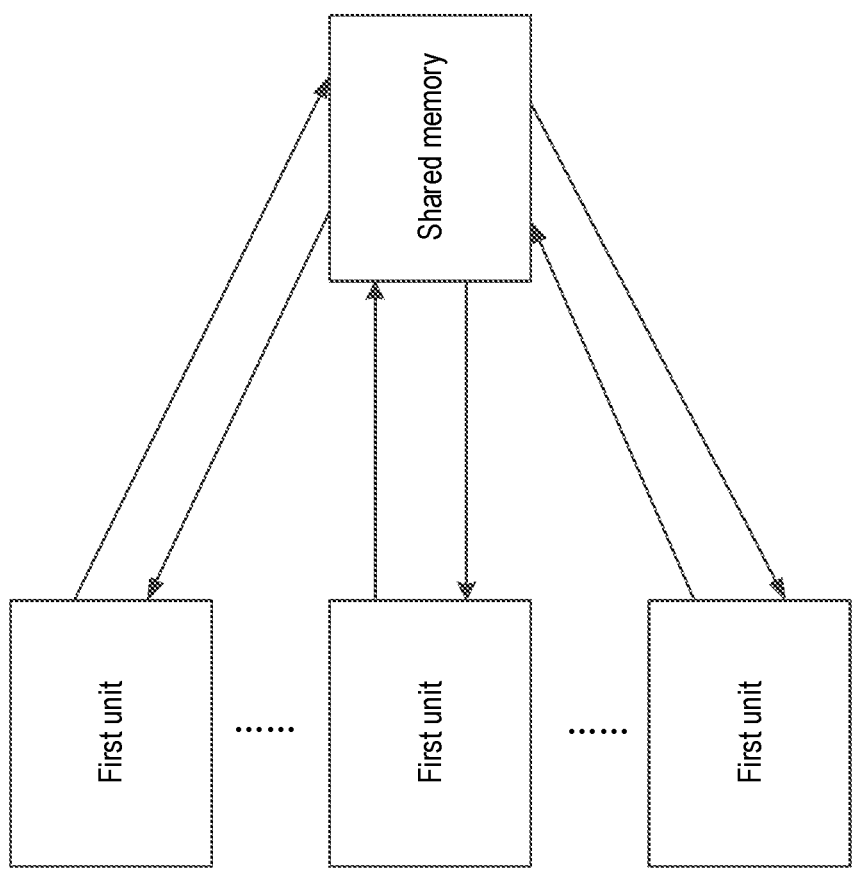
FIG. 3 shows a structural block diagram of a system according to an embodiment of the present disclosure.

FIG. 3 shows a structural block diagram of a system according to an embodiment of the present disclosure. In a possible implementation manner, the first unit may be a master. The master may be a processor, or a core in a processor, or an external device, that is, the first unit may be a processor or a core in a processor. The processor can be a general-purpose processor, such as a CPU (Central Processing Unit), an artificial intelligence processing unit (IPU) for performing artificial intelligence operations, a microprocessor, an embedded processor, an ARM (Advanced RISC Machines) processor, a GPU (Graphics Processing Unit), a video processor, a video codec processor, a DSP (Digital Signal Processor), a NPU (neural-network processing unit), an ASIC (Application Specific Integrated Circuit) chip, a FPGA (Field Programmable Gate Array) chip, etc. The artificial intelligence operations can include machine learning operations, brain-like operations, etc. The machine learning operations include neural network operations, k-means operations, and support vector machine operations. The above-mentioned IPU may also include one or more of a GPU, a NPU, a DSP, an ASIC chip, and an FPGA chip. The present disclosure does not limit the specific type of the processing unit. The external device may be a device provided with a processor.

The shared memory can be composed of a memory of any type or structure. For example, the shared memory can be composed of a magnetic core memory, a semiconductor memory, a magnetic disk, etc., can be composed of a random access memory or a sequential access memory, can be composed of a random read/write memory, can be composed of a permanent memory or a non-permanent memory, can be composed of a main memory, an auxiliary memory, a cache, a control memory, etc., which is not limited by the present disclosure.

As shown in FIG. 3, the system may include one or more first units. The one or more first units can all send write requests (or read requests) to the shared memory. When the plurality of first units send requests (for example, write requests or read requests) to the shared memory, the shared memory can execute the requests according to the order in which the requests are received. In other words, for a plurality of masters, they may initiate requests to the same address field of the shared memory at the same time, but the requests are executed serially in the shared memory, which may improve the access efficiency.

The operator in a write request can indicate what kind of operation should be performed for the request. The destination address in a write request can point to a segment of shared memory space in the shared memory, where the operand corresponding to the operator is stored in the shared memory space. Therefore, after receiving the write request, the shared memory can find the corresponding segment of shared storage space according to the destination address, obtain the operand from the shared storage space, use the operator to perform an operation on the operand to obtain an operation result of the operation, and then write the operation result in the destination address to complete the write operation.

Figure 4:
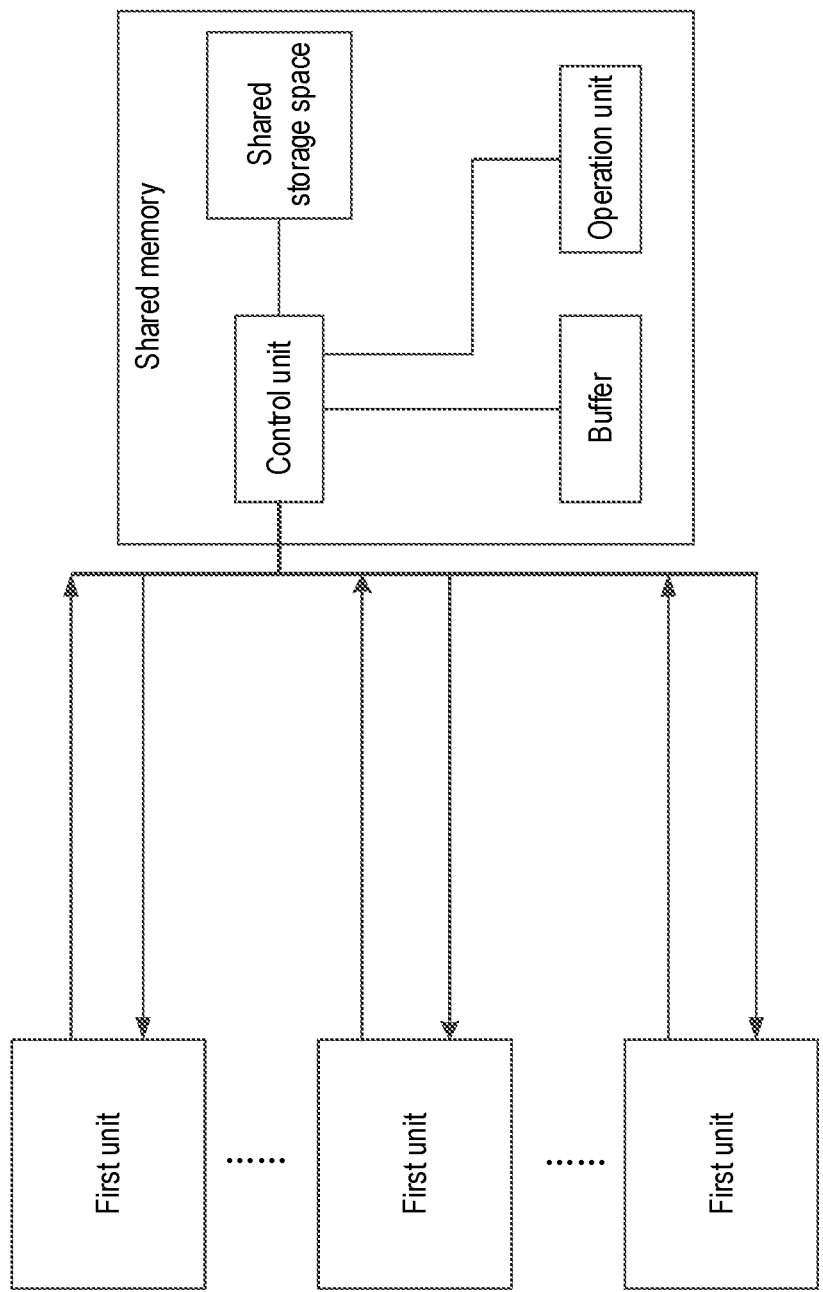
FIG. 4 shows a structural block diagram of a system according to an embodiment of the present disclosure.

FIG. 4 shows a structural block diagram of a system according to an embodiment of the present disclosure. As shown in FIG. 4, in a possible implementation, the shared memory includes a shared storage space and an operation unit. The shared storage space is configured to store shared data. The operation unit may be configured to execute an operation corresponding to an operator. The operation unit may be an arithmetic and logic unit (ALU), or another type of module that can modify data, which is not limited in the present disclosure. The shared memory may further include a control unit. The control unit may be connected to the shared storage space and the operation unit respectively.

The control unit can be realized by a dedicated hardware circuit, or may be realized by a general processing hardware (such as a CPU, a single-chip microcomputer, a field programmable logic device FPGA, etc.) combined with an executable logic instruction, so as to execute the working process of the control unit. The present disclosure does not limit the specific implementation of the control unit.

In a possible implementation, the control unit is configured to obtain the operand from the shared storage space according to the destination address after receiving the write request. The control unit is configured to send an operation instruction to the operation unit according to the operator and the operand. The operation unit is configured to perform an operation on the operand according to the operation instruction to obtain an operation result, and send the operation result to the control unit. The control unit is configured to write the operation result in the destination address.

Exemplarily, the control unit can receive a write request sent by the first unit, parse the write request, obtain an operator and a destination address, and then search for a segment of shared storage space in the shared storage space according to the destination address, and read the operand from the segment of shared memory space. After the operand is obtained, the operation instruction can be generated according to the operator and the operand and then sent to the operation unit. After the operation unit receives the operation instruction, the operation unit can execute the operation instruction to realize the operation of the operand to obtain the operation result, and then return the operation result to the control unit. The control unit writes the operation result to the destination address to complete the write operation.

In a possible implementation, after performing the write operation, the shared memory can also return a response signal to the first unit to indicate the completion of the operation corresponding to the write request, which is as shown in the signal flow indicated by the arrows pointing to the left in FIG. 4.

By setting an operation unit in the shared memory to implement the operation process in the shared memory, an operand read does not need to be returned to the first unit in time, the shared memory can directly perform an operation on the operand to obtain an operation result and then write the result. The system provided by the present disclosure may help to simplify the interaction process so that most of the time spent in the data obtaining and writing stages can be saved, thereby reducing the execution delay of the Read-Modify-Write process. Especially for a last level of shared storage space in a hierarchical shared memory, the access path for the first unit to access the last level of shared storage space may be very long. In this case, the effect of reducing the execution delay by using the system of the present disclosure may be more apparent.

In a possible implementation, the write request may also carry a read request identifier. The read request identifier is configured to indicate that the first unit needs to obtain the operand, that is, the first unit needs to obtain the operand after receiving the write request.

As shown in FIG. 4, in a possible implementation manner, the shared memory further includes a buffer. The buffer may be an origin data buffer (ODB) which is configured to store the above-mentioned operand. The buffer may be connected to the control unit. The control unit is configured to store the operand in the buffer according to the read request identifier after obtaining the operand. The control unit is configured to send a response signal to the first unit after writing the operation result in the destination address. The response signal carries storage information of the operand in the buffer.

In a possible implementation, a read request identifier bit can be set in the write request. The specific identifier of the read request identifier bit can be configured to indicate whether the first unit needs to obtain the operand. Therefore, the read request identifier bit can include: a read request identifier, and an identifier indicating read request not needed. In an example, the read request identifier bit can be set to different values to represent different identifiers. For example, the read request identifier bit can be set to 0 or 1, where 1 represents a read request identifier, and 0 represents an identifier indicating read request not needed. It should be noted that the foregoing example is only a possible implementation of the present disclosure, and does not limit the scope of the present disclosure in any way. Those skilled in the art can understand that the foregoing process may also be implemented in other manners.

According to the foregoing embodiment, after receiving the write request, the control unit can also determine whether it is necessary to return the operand to the first unit according to information of the read request identifier bit carried by the write request. If the write request carries the read request identifier, the control unit may determine that it needs to return the operand to the first unit. In this case, the control unit may store the operand in the buffer after obtaining the operand. The control unit is configured to send an operation instruction to the operation unit according to the operator and the operand. The operation unit is configured to perform an operation on the operand according to the operation instruction to obtain an operation result, and send the operation result to the control unit. The control unit is configured to write the operation result in the destination address. After writing the operation result in the destination address, the control unit can send a response signal to the first unit. The response signal can carry storage information of the operand in the buffer, such as a storage address.

In a possible implementation, the first unit is configured to send a read request to the shared memory according to the storage information after receiving the response signal. The control unit is configured to obtain the operand according to the storage information in response to the read request after receiving the read request, and return the operand to the first unit.

After receiving the response signal, the first unit can parse the response signal to obtain the storage information, and then generate a read request according to the storage information. The read request carries the storage information. The first unit sends a read request to the shared memory. After receiving the read request, the control unit of the shared memory parses the read request to obtain the storage information, searches the buffer according to the storage information to obtain the operand, and returns the operand to the first unit.

If the write request carries an identifier indicating read request not needed, the control unit can determine that there is no need to return the operand to the first unit. In this case, the control unit may not need to store the operand in the buffer after obtaining the operand.

By using the method above, the system can be compatible with commonly used applications in the industry. In some applications, the first unit needs to obtain the operand before modification for other purposes. Therefore, according to the system of the embodiment above, a write request carries the read request identifier when being initiated. In this way, the operand before modification can be returned to the first unit so that the foregoing problem may be solved.

Regarding the first unit above, the first unit can access the shared storage space, and may be a unit that can actively initiate a request. For example, the first unit can initiate a write request or a read request to the shared memory. The present disclosure also provides a method for accessing a shared storage space. The method may include:

a step S11: sending a write request to a shared memory, where the write request carries an operator and a destination address, so that the shared memory can obtain an operand according to the destination address, use the operator to perform an operation on the operand to obtain an operation result, and write the operation result in the destination address.

Regarding the shared memory above, the present disclosure also provides another method for accessing a shared storage space. The method may include:

a step S20, receiving the write request, where the write request carries an operator and a destination address;

a step S21, obtaining an operand according to the destination address, using the operator to perform an operation on the operand to obtain an operation result, and writing the operation result to the destination address; and a step S22, after completing the operation of the write request, returning, by the shared memory, a response signal to the first unit.

Figure 5:
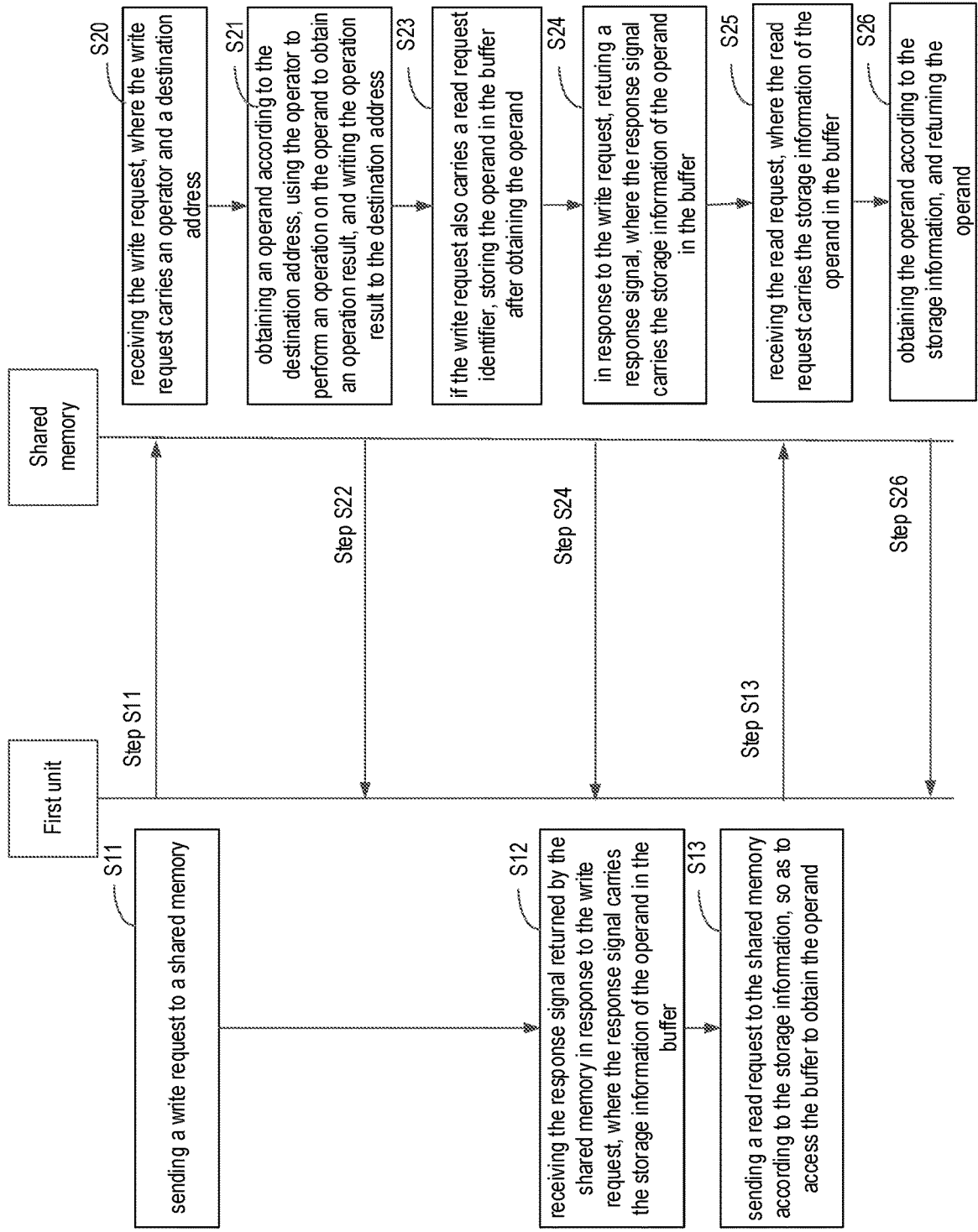
FIG. 5 shows an interaction diagram of a method for accessing a shared storage space according to an embodiment of the present disclosure.

FIG. 5 shows an interaction diagram of a method for accessing a shared storage space according to an embodiment of the present disclosure. As shown in FIG. 5, in the step S11, the first unit sends a write request to the shared memory, where the write request carries an operator and a destination address; in the step S20, the shared memory receives the write request; then in the step S21, the shared memory obtains the operand according to the destination address, uses the operator to perform an operation on the operand to obtain an operation result, and writes the operation result in the destination address; and in the step S22, the shared memory returns a response signal to the first unit after completing the operation of the write request.

It can be seen from the comparison between the process from the step S11 to the step S22 in FIG. 5 and the process shown in FIG. 1+FIG. 2 that in order to complete the write operation, the process of FIG. 5 only needs the step S11 and the step S22, which involves two interactions, while the process of FIG. 1+FIG. 2 involves six interactions. According to the comparison process above, it can be seen that according to the method for accessing a shared storage space provided by the present disclosure, the interaction process may be greatly reduced, and the execution delay of the "read+modify+write" process can be reduced too.

In a possible implementation, the write request may also carry a read request identifier. The read request identifier may be used to indicate that the operand needs to be obtained. The write request may also be used to make the shared memory store the operand in the buffer after obtaining the operand.

In this embodiment, regarding the above-mentioned shared memory, the method for accessing a shared storage space provided by the present disclosure may further include:

a step S23, if the write request also carries a read request identifier, storing the operand in the buffer after obtaining the operand, where the read request identifier is used to indicate that the first unit needs to obtain the operand; and a step S24, in response to the write request, returning a response signal, where the response signal carries storage information of the operand in the buffer.

In this embodiment, for the side where the first unit is located, the method for accessing a shared storage space may further include:

a step S12, receiving the response signal which is returned by the shared memory in response to the write request, where the response signal carries the storage information of the operand in the buffer; and a step S13: sending a read request to the shared memory according to the storage information, so as to access the buffer to obtain the operand.

As shown in FIG. 5, in the step S23, after receiving the write request, the shared memory can also determine whether it is needed to return the operand to the first unit according to information of the read request identifier bit carried by the write request, if the write request also carries a read request identifier, the shared memory stores the operand in the buffer after obtaining the operand; in the step S24, in response to the write request in step S11, a response signal is returned, where the response signal carries the storage information of the operand in the buffer. In the step S12, the first unit receives the response signal which is returned by the shared memory in response to the write request, and can parse the response signal to obtain the storage information; in the step S13, the first unit sends a read request to the shared memory according to the storage information. Regarding the shared memory, following the process above, the method may further include:

a step S25: receiving the read request, where the read request carries the storage information of the operand in the buffer; and a step S26: obtaining the operand according to the storage information, and returning the operand.

As shown in FIG. 5, after the step S13 and in the step S25, the shared memory receives the read request sent by the first unit, where the read request carries the storage information of the operand in the buffer; in the step S26, the shared memory obtains the operand according to the storage information, and returns the operand to the first unit.

It should be noted that for the explanation of any feature in the method provided in FIG. 5, please refer to the content of the system part above.

Application Example

Figure 6:
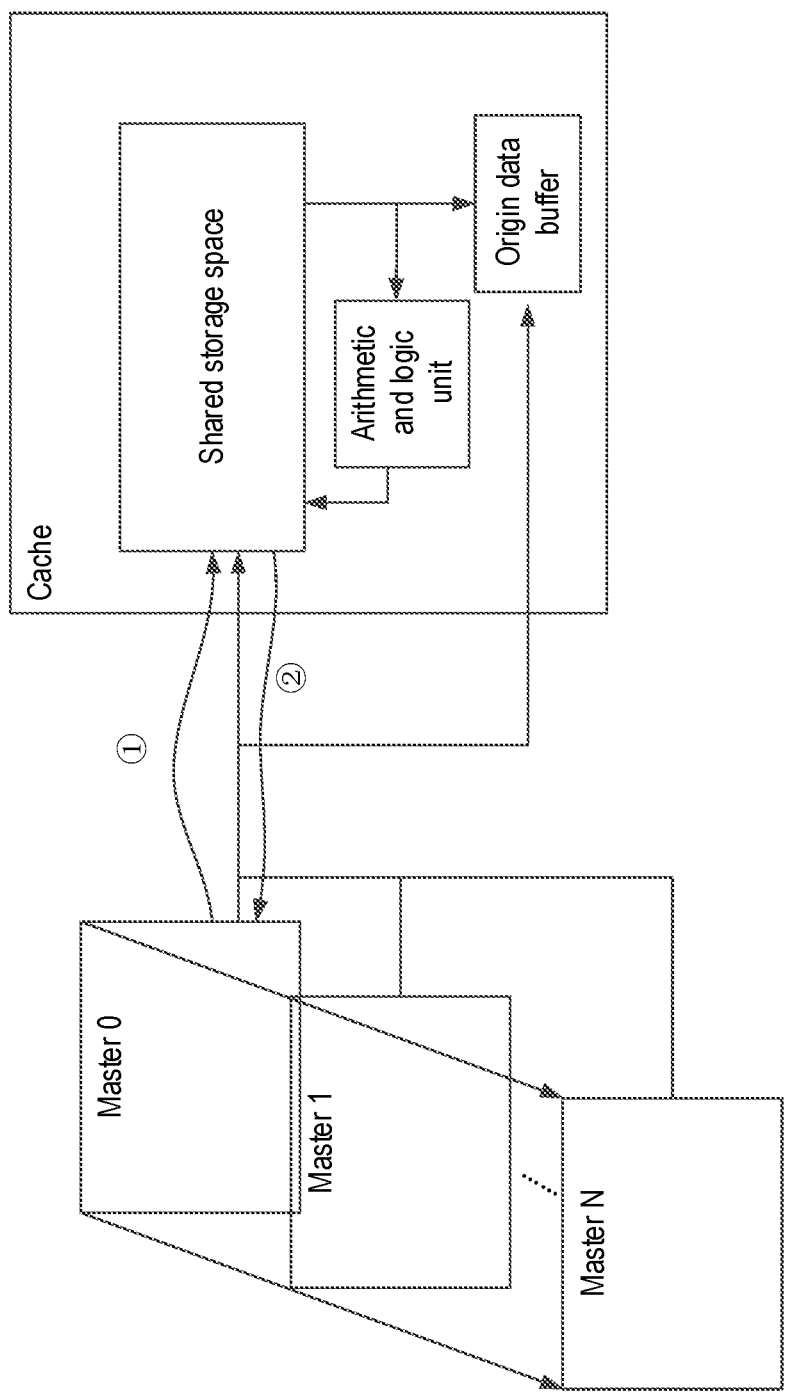
FIG. 6 shows a schematic diagram of a write operation process according to an embodiment of the present disclosure.
Figure 7:
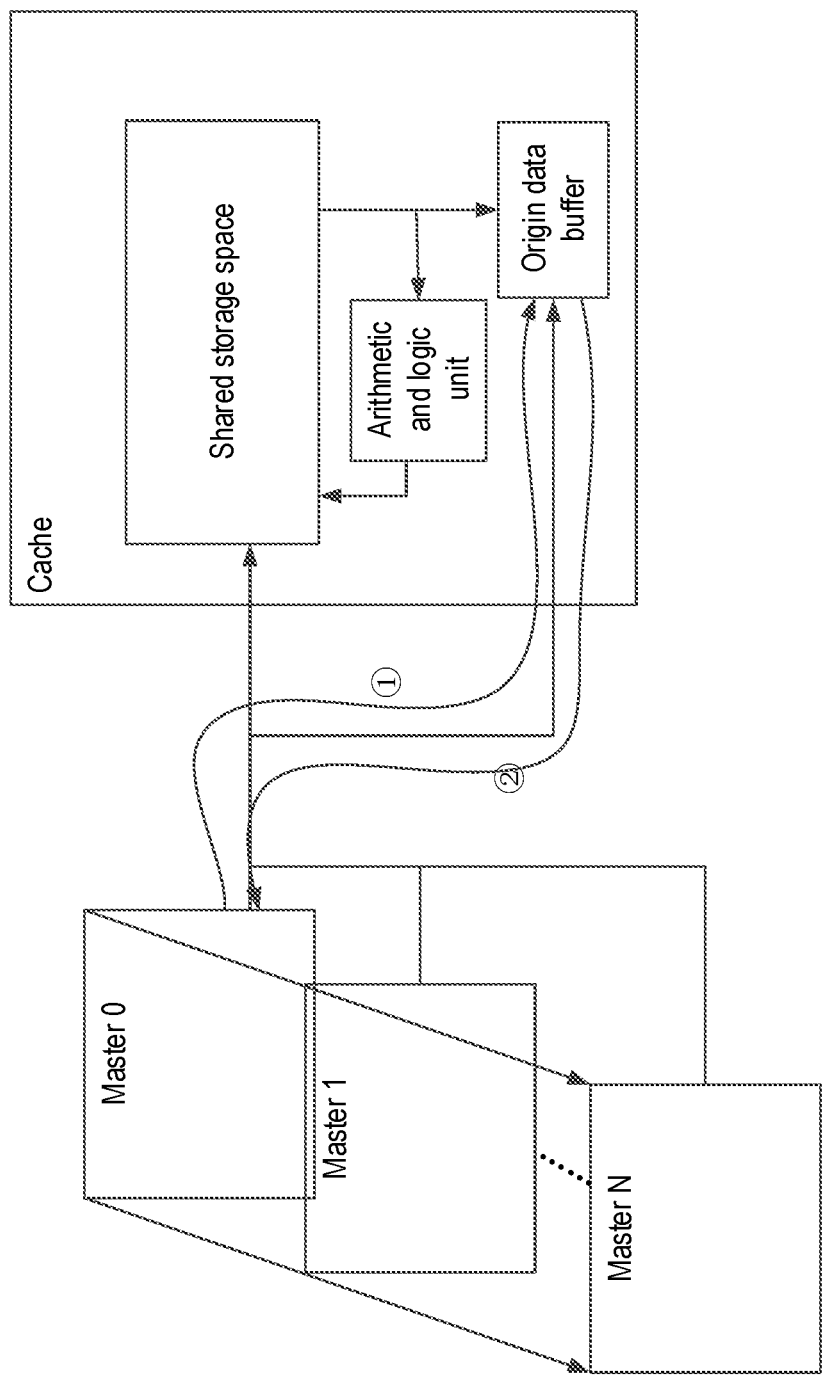
FIG. 7 shows a schematic diagram of a read operation process according to an embodiment of the present disclosure.

The following uses a specific operation as an example of an application scenario to describe the method and the system of the present disclosure. FIG. 6 shows a schematic diagram of a write operation process according to an embodiment of the present disclosure. FIG. 7 shows a schematic diagram of a read operation process according to an embodiment of the present disclosure.

The purpose of the present disclosure is to improve the efficiency of the system in performing a read-modify-write operation by adjusting the system structure and the operation flow on the premise of ensuring data consistency. The basic idea of the read-modify-write operation realized in the present disclosure is to reduce the memory access interaction between the master and the cache. For example, Master0 is about to modify the shared data A, which in particular, is about to DEC (decrease) the shared data A. The expression is represented as:

$$DEC: D = (A <= 0)?B:(A-1)$$

A method for realizing a read-modify-write operation provided by the present disclosure is as follows: Master0 first initiates a write request to the cache, where the write request includes an operand B; an address and an operator of the operand B and an operand A are transferred to the cache by means of a write request; after the cache obtains the operand A from the shared storage space according to the address of the operand A, an arithmetic and logic operation is performed in the cache to obtain D; and finally the cache stores D in the address of the operand A. See FIG. 6 for the process above. The curves ① and ② in FIG. 6 represent the command interaction between the master and the cache. The command flow from the master to the cache represents the write request. The command flow from the cache to the master represents the transfer of the response signal, indicating that the cache has finished the write operation.

There is a difference of system structure between the present disclosure and the implementation method of a read-modify-write operation based on an access lock, which is the location deployment of ALU. In the present disclosure, ALU is moved from the master to the cache. The purpose of doing so is to reduce the execution delay of the "read+modify+write" process. The access path from the master to the cache may be very long, especially when the cache is a last level cache (LLC) in the system. In this disclosure, after reading the operand, the cache can directly modify the operand according to the operator, and then write the modified operand. Therefore, the design of the present disclosure saves most of the time spent in the data obtaining and writing stages.

In order to make the design of the present disclosure compatible with the commonly used software in the industry, the present disclosure also provides a read command. In some applications, the master (the first unit) needs to obtain the shared operand before modification for some purposes. However, in the present disclosure, the result of the write request cannot return the shared operand before modification to the master. In order to fulfill the purpose, the present disclosure also provides a read operation.

If the master not only needs to initiate a write request, but also needs to obtain the shared operand before modification, the master can carry an identifier indicating read request needed when initiating the write request (most buses support carrying some additional information). When the cache executes a write request, after obtaining the operand, in addition to performing an operation on the operand, the cache can also store the operand in an origin data buffer (ODB). When the cache finishes executing AWC and returns a response signal to the master, the cache can carry information that is stored in ODB by the operand (origin data) before modification on the bus and return the information to the master.

After receiving the response signal of the write request, the master can initiate a read request to the cache. Refer to FIG. 7 for the command flow. After Master0 sends a read request, Master0 directly accesses ODB in the cache to obtain origin data.

If the master only needs to initiate a write request and does not need to obtain the shared operand before modification, the master does not need to carry the identifier of a read request when initiating the write request. When the cache processes such a write request, the cache does not store the operand before modification in ODB.

When a plurality of masters need to initiate read-and-write operations on the same shared storage space, a first step is that the plurality of masters initiate write requests, the cache executes the requests according to the order in which the requests are received. After a current write requests is completed (an operation result of ALU has been written to the shared memory), a next write request can be executed. The present disclosure relies on the cache to perform order-preserving execution of write requests with the same target address to achieve the purpose of maintaining data consistency. Therefore, it can be seen that in the present disclosure, for the plurality of masters, they may initiate read-modify-write operation requests to the same shared address segment at the same time, but the execution in the cache is serial.

It should be noted:

a) the above-mentioned master is all devices and processors that can access the cache;

b) the above-mentioned data stream bus supports all bus protocols that can transfer data that is read and written and user-defined information;

c) the above-mentioned ALU module can also be another module that can modify data;

d) the above-mentioned cache can be caches or memories at all levels in the system that the master can access.

Compared with the traditional implementation, the implementation of a read-modify-write operation provided by the present disclosure has high efficiency and flexibility.

High Efficiency

In the present disclosure, if the implementation provided by the present disclosure is applied to a system where a path delay between the master and the cache is long, in a situation that the master does not need to obtain origin data, the master only needs to initiate a write request once, of which the time delay for initiating a write request is the same as that of the traditional implementation. Therefore, it can be said that the efficiency of the read-modify-write operation method provided by the present disclosure is much higher than that of the traditional method which is based on an access lock.

In addition, when the implementation of a read-modify-write operation that is based on an access lock is adopted, a plurality of masters may initiate read-modify-write operations on the same shared storage space at the same time. In this case, the masters can only access the shared storage space serially. In the present disclosure, when a plurality of masters initiate read-modify-write operations on the same shared storage space at the same time, since there is no restriction of obtaining locks, the operations can be initiated in parallel. However, in order to maintain data consistency, the cache may execute the write requests in serial internally. T1 is used to indicate the time when a current write-after-read operation blocks a next read-modify-write operation with the same target address when the traditional solution based on an access lock is adopted. T2 is used to indicate the time when a current read-modify-write operation blocks read-modify-write operations with the same target address initiated by other masters when the method provided by the present disclosure is adopted. The meanings of T1 and T2 both include: reading delay, ALU computation delay, and writing delay. However, the reading delay and writing delay of T2 are far shorter than the delay of T1, which is due to the fact that the reading and writing of T2 occur inside the cache, while the reading and writing of T1 occur on a transmission path between the master and the cache. Therefore, the present disclosure can effectively increase the efficiency of a read-modify-write operation.

Flexibility

The present disclosure can choose whether to return origin data or not. When the master initiates a read request, it does not affect the current master and other masters to initiate other write requests or read requests.

It should be noted that, the foregoing embodiments of method, for the sake of conciseness, are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and the actions and modules involved are not necessarily required for this disclosure.

Further, it should be explained that though the steps in the flowchart FIG. 5 are shown by following the direction of arrows, yet these steps may not necessarily be performed according to the order indicated by the arrows. Unless clearly stated herein, the order for performing these steps is not strictly restricted. These steps may be performed in a different order. Additionally, at least part of the steps shown in FIG. 5 may include a plurality of sub-steps or a plurality of stages. These sub-steps or stages may not necessarily be performed and completed at the same time, instead, these sub-steps or stages may be performed at different time. These sub-steps or stages may not necessarily be performed sequentially either, instead, these sub-steps or stages may be performed in turn or alternately with at least part of other steps, or sub-steps of other steps, or stages.

Figure 8:
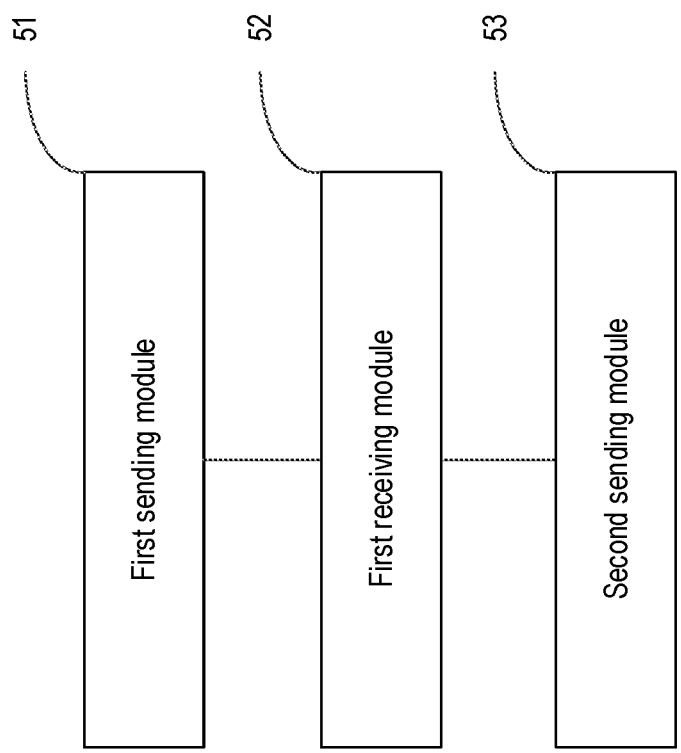
FIG. 8 shows a block diagram of a device for accessing a shared storage space according to an embodiment of the present disclosure.

FIG. 8 shows a block diagram of a device for accessing a shared storage space according to an embodiment of the present disclosure. The device is applied to the first unit. The first unit can access the shared storage space. For example, the first unit can actively initiate a request (a write request or a read request) to the shared storage space. The first unit is a processor or a core in a processor. See above for the description of the processor.

As shown in FIG. 8, the device may include:

a first sending module 51 configured to send a write request to the shared memory. The write request carries an operator and a destination address, so that the shared memory can obtain an operand according to the destination address, use the operator to perform an operation on the operand to obtain an operation result, and write the operation result in the destination address.

The device provided by the present disclosure may help to simplify the interaction process so that most of the time spent in the data obtaining and writing stages can be saved, thereby reducing the execution delay of the read-modify-write process. In particular for a last level of shared storage space in a hierarchical shared memory, the access path for the first unit to access the last level of shared storage space may be very long. In this case, the effect of reducing the execution delay by using the method of the present disclosure may be more apparent.

In a possible implementation, the write request carries a read request identifier. The read request identifier is used to indicate that the first unit needs to obtain the operand. The write request is also used to make the shared memory store the operand in the buffer after obtaining the operand.

In a possible implementation manner, the device further includes:

a first receiving module 52 configured to receive a response signal which is returned by the shared memory in response to the write request, where the response signal carries storage information of the operand in the buffer; and a second sending module 53 configured to send a read request to the shared memory according to the storage information, so as to access the buffer to obtain the operand.

Figure 9:
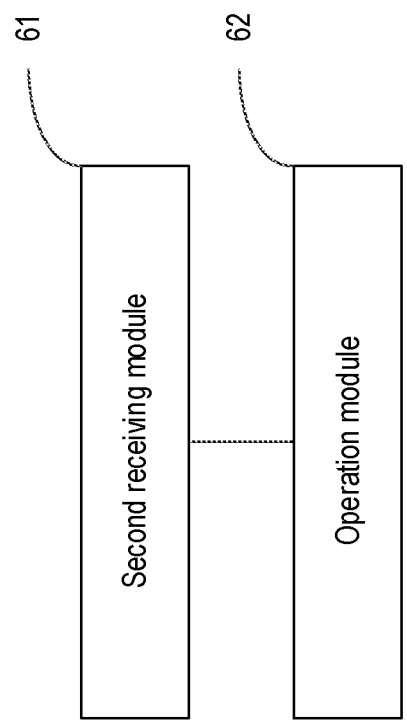
FIG. 9 shows a block diagram of a device for accessing a shared storage space according to an embodiment of the present disclosure.

FIG. 9 shows a block diagram of a device for accessing a shared storage space according to an embodiment of the present disclosure. The device is applied to a shared memory, and the device includes:

a second receiving module 61 configured to receive the write request, where the write request carries the operator and the destination address; and an operation module 62 configured to obtain the operand according to the destination address, use the operator to perform an operation on the operand to obtain an operation result, and write the operation result in the destination address.

The device provided by the present disclosure may help to simplify the interaction process so that most of the time spent in the data obtaining and writing stages can be saved, thereby reducing the execution delay of the read-modify-write process. In particular for a last level of shared storage space in a hierarchical shared memory, the access path for the first unit to access the last level of shared storage space may be very long. In this case, the effect of reducing the execution delay by using the method of the present disclosure may be more apparent.

Figure 10:
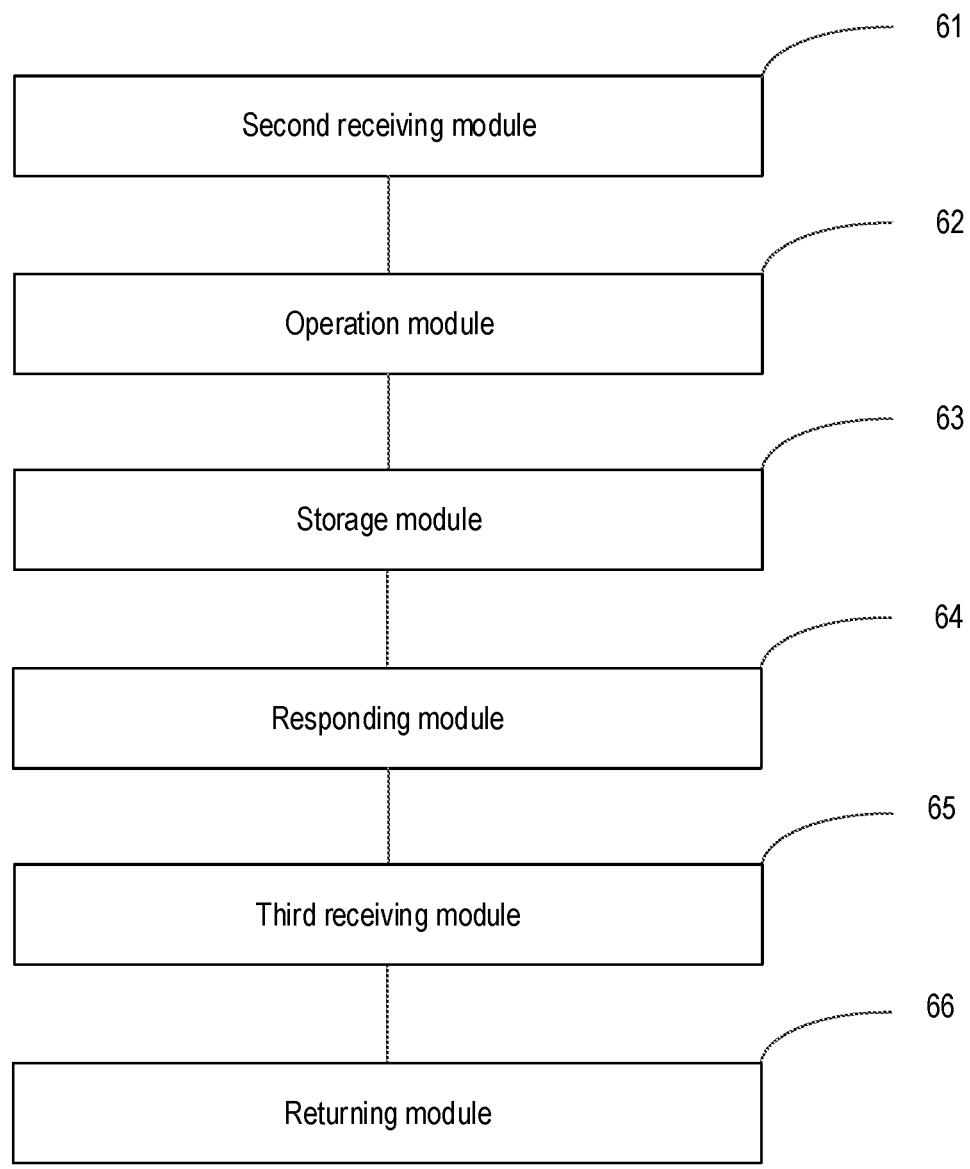
FIG. 10 shows a block diagram of a device for accessing a shared storage space according to an embodiment of the present disclosure.

FIG. 10 shows a block diagram of a device for accessing a shared storage space according to an embodiment of the present disclosure.

In a possible implementation, as shown in FIG. 10, the device further includes:

a storage module 63 configured to, if the write request also carries a read request identifier, store the operand in the buffer after obtaining the operand, where the read request identifier is used to indicate that the side by which the write request is sent needs to obtain the operand; and a responding module 64 configured to return a response signal in response to the write request, where the response signal carries storage information of the operand in the buffer.

In a possible implementation manner, the device further includes:

a third receiving module 65 configured to receive the read request, where the read request carries the storage information of the operand in the buffer; and a returning module 66 configured to obtain the operand according to the storage information, and return the operand.

Figure 11:
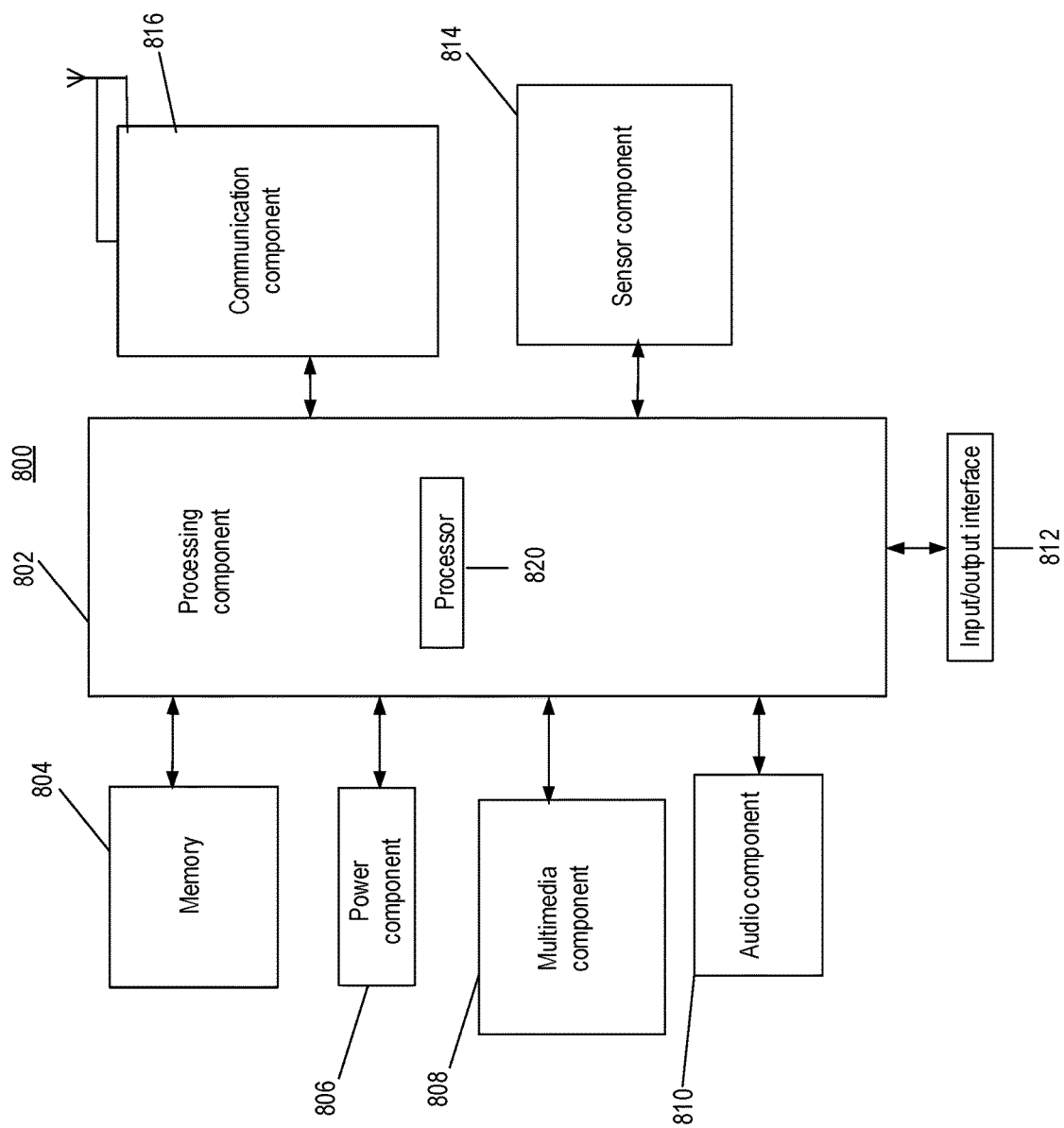
FIG. 11 is a block diagram of a device for accessing a shared storage space according to an exemplary embodiment.

FIG. 11 is a block diagram of a device 800 for accessing a shared storage space according to an exemplary embodiment. For example, the device 800 may be a mobile phone, a computer, a digital broadcasting terminal, a message transceiving device, a game console, a tablet equipment, a medical equipment, a fitness equipment, and a personal digital assistant, etc.

Referring to FIG. 11, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as operations associated with display, telephone calls, data communications, camera operations, and recording operations. The processing component 802 may include one or more processors 820 for executing instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations of the device 800. Examples of these types of data include instructions for any application or method operating on the device 800, contact data, phone-book data, messages, pictures, videos, etc. The memory 804 can be implemented by using any type of volatile or non-volatile storage equipment or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 provides power to various components of the device 800. The power component 806 may include a power management system, one or more power supplies, and other components associated with the power generation, management, and distribution of the device 800.

The multimedia component 808 includes a screen that provides an output interface for the device 800 and the user. In some embodiments, the screen may include a liquid crystal display (LCD) and a touch panel (TP). If the screen includes a touch panel, the screen may be a touch screen capable of receiving input signals from the user. The touch panel includes one or more touch sensors to detect touch, sliding, and gestures performed on the touch panel. The touch sensor may not only detect the boundary of a touch or sliding action, but also detect the duration and pressure of the touch or slide action. In some embodiments, the multimedia component 808 includes a front camera and/or a rear camera. When the device 800 is in an operation mode such as a shooting mode or a video mode, the front camera and/or the rear camera can receive external multimedia data. Each front camera and rear camera can be a fixed optical lens system or cameras with focal length and optical zoom capabilities.

The audio component 810 is configured to output and/or input audio signals. For example, the audio component 810 includes a microphone (MIC). When the device 800 is in an operation mode such as a call mode, a recording mode, and a voice recognition mode, the microphone is configured to receive external audio signals. An audio signal received by the audio component 810 may be further stored in the memory 804 or transferred by the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, a button, and the like. The button may include but is not limited to: a home button, a volume button, a start button, and a lock button.

The sensor component 814 includes one or more sensors for providing the device 800 with status assessments of various aspects. For example, the sensor component 814 can detect the on/off status of the device 800 and the relative positioning of components such as a display and a keypad of the device 800. The sensor component 814 can also detect the position change of the device 800 or a component of the device 800, the presence or absence of contact between the user and the device 800, the orientation or acceleration/deceleration of the device 800, and the temperature change of the device 800. The sensor component 814 may include a proximity sensor configured to detect the presence of nearby objects when there is no physical contact between them. The sensor component 814 may also include a light sensor, such as a CMOS or CCD image sensor for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the device 800 and other equipments. The device 800 can access a wireless network based on a communication standard, such as WiFi, 2G, or 3G, or a combination thereof. In an exemplary embodiment, the communication component 816 receives broadcast signals or information related to broadcast from an external broadcast management system via a broadcast channel. In an exemplary embodiment, the communication component 816 further includes a near field communication (NFC) module to facilitate short-range communication. For example, the NFC module can be implemented based on the radio frequency identification (RFID) technology, the infrared data association (IrDA) technology, an ultra-wide band (UWB) technology, a bluetooth (BT) technology, and other technologies.

In an exemplary embodiment, the device 800 may be implemented by one or more of an application specific integrated circuit (ASIC), a digital signal processor (DSP), a digital signal processing device (DSPD), a programmable logic device (PLD), a field-programmable gate array (FPGA), a controller, a micro-controller, a micro-processor, or other electronic components, and is used to perform the method above.

An exemplary embodiment provides a non-volatile computer-readable storage medium. For example, the non-volatile computer-readable storage medium may be the memory 804 that includes a computer program instruction. The computer program instruction can be executed by the processor 820 of the device 800 to complete the method above.

Figure 12:
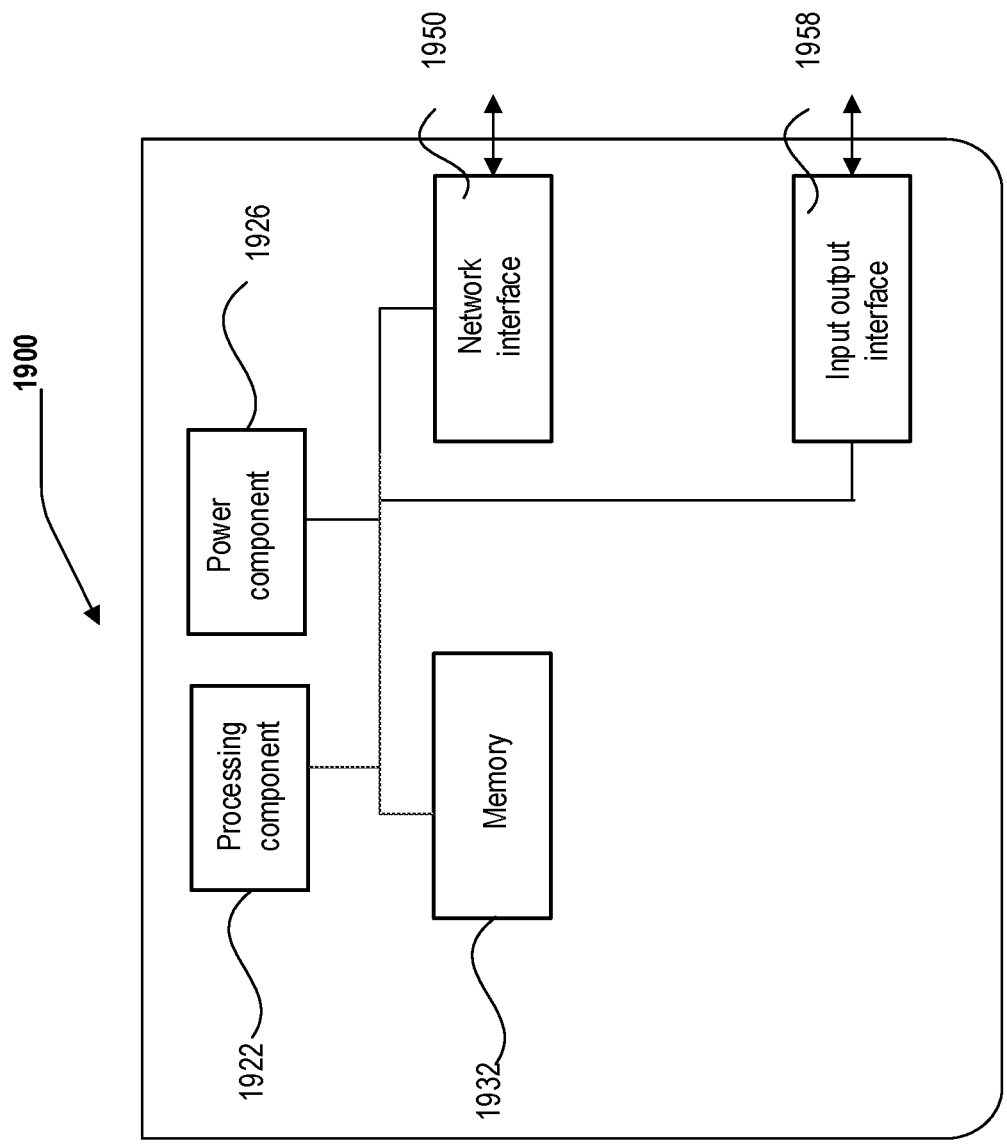
FIG. 12 is a block diagram of a device for accessing a shared storage space according to an exemplary embodiment.

FIG. 12 is a block diagram of a device 1900 for accessing a shared storage space according to an exemplary embodiment. For example, the device 1900 may be provided as a server. Referring to FIG. 12, the device 1900 includes a processing component 1922. The processing component 1922 further includes one or more processors, and a memory resource represented by a memory 1932 for storing an instruction executable by the processing component 1922, such as an application program. The application program stored in the memory 1932 may include one or more modules, of which each corresponds to a set of instructions. In addition, the processing component 1922 is configured to execute the instruction to perform the above-described method.

The device 1900 may also include a power component 1926 configured to perform power management for the device 1900, a wired or wireless network interface 1950 configured to connect the device 1900 to a network, and an input output (I/O) interface 1958. The device 1900 can operate an operating system stored in the memory 1932, such as Windows Server™, Mac OS X™, Unix™, Linux™, FreeBSD™, or the like.

An exemplary embodiment provides a non-volatile computer-readable storage medium. For example, the non-volatile computer-readable storage medium may include the memory 1932 where a computer program instruction is stored. The computer program instruction can be executed by the processing component 1922 of the device 1900 to complete the method above.

It should be understood that the foregoing device embodiments are only illustrative, and the device of the present disclosure may also be implemented in other ways. For example, the division of the units/modules in the foregoing embodiment is only a logical function division, and there may be other division methods in actual implementation. For example, a plurality of units, modules, or components may be combined or integrated into another system, or some features may be omitted or not implemented.

In addition, unless otherwise specified, the functional units/modules in the various embodiments of the present disclosure may be integrated into one unit/module. Alternatively, each unit/module may exist alone physically. Alternatively, two or more units/modules may be integrated together. The above-mentioned integrated units/modules can be implemented in the form of hardware or in the form of software program modules.

When the above-mentioned integrated units/modules are implemented in the form of hardware, the hardware may be a digital circuit, an analog circuit, and the like. Physical implementation of the hardware structure may include, but is not limited to, a transistor, a memristor, and the like. Unless otherwise specified, the processor may be any appropriate hardware processor, such as CPU, GPU, FPGA, DSP, ASIC, and the like. Unless otherwise specified, the storage unit may be any suitable magnetic storage medium or magneto-optical storage medium, such as RRAM (Resistive Random Access Memory), DRAM (Dynamic Random Access Memory), SRAM (Static Random-Access Memory), EDRAM (Enhanced Dynamic Random Access Memory), HBM (High-Bandwidth Memory), HMC (Hybrid Memory Cube), and the like.

If the integrated units/modules are implemented in the form of software program modules and sold or used as an independent product, the product can be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

The present disclosure may be a system, a method, and/or a computer program product. The computer program product may include a computer-readable storage medium loaded with computer-readable program instructions for enabling a processor to implement various aspects of the present disclosure.

The computer-readable storage medium may be a tangible device that can hold and store the instruction used by the instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (which is a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, a punched card or a groove structure with protrusion inside where an instruction is stored, and any suitable combination of the above. The computer-readable storage medium should not be interpreted as a transient signal, such as radio waves or other electromagnetic waves that are freely propagated, electromagnetic waves that are propagated through waveguides or other transmission media (for example, light pulses through fiber-optic cables), or electrical signals that are transferred through wires.

The computer-readable program instructions described herein can be downloaded from the computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives the computer-readable program instructions from the network, and forwards the computer-readable program instructions for storage in the computer-readable storage medium in each computing/processing device.

The computer program instruction used to perform the operations of the present disclosure may be an assembly instruction, an instruction set architecture (ISA) instruction, a machine instruction, a machine-related instruction, a microcode, a firmware instruction, a status setting data, or a source code or object code written in any combination of one or more programming languages. The programming languages include object-oriented programming languages such as Smalltalk, C++, and conventional procedural programming languages such as "C" language or similar programming languages. The computer-readable program instructions can be executed entirely on a user's computer, partly executed on a user's computer, executed as an independent software package, partly executed on a user's computer and partly executed on a remote computer, or entirely executed on a remote computer or server. In the case of a remote computer, the remote computer can be connected to a user's computer through any kind of network, including a local area network (LAN) or a wide area network (WAN), or can be connected to an external computer (for example, connected to an external computer through the Internet provided by an Internet service provider). In some embodiments, the status information of the computer-readable program instructions can be used to customize an electronic circuit such as a programmable logic circuit, a field programmable gate array (FPGA), or a programmable logic array (PLA). The electronic circuit can execute the computer-readable program instructions so as to realize various aspects of the present disclosure.

Aspects of the present disclosure are described according to the flowcharts and/or the block diagrams of the method, the device (system), and the computer program product provided by the present disclosure. It should be understood that each block of the flowcharts and/or block diagrams and combinations of the blocks in the flowcharts and/or block diagrams can be implemented by computer-readable program instructions.

The computer program instructions may be provided to the processor of a general-purpose computer, a special-purpose computer, or another programmable data processing device so that a machine can be formed. The processor of a computer or another programmable data processing device can execute the instruction to form a device for realizing a function/action of a step or a plurality of steps in the flowcharts and/or one or more blocks in the block diagrams. The computer-readable program instructions can also be stored in the computer-readable storage medium. The instructions make a computer, a programmable data processing device, and/or another device work in a specific manner, so that the computer-readable medium where the instructions are stored includes a product which includes instructions for realizing various aspects of a function/action specified in one or more blocks in a flowchart and/or block diagram of the present disclosure.

The computer-readable program instructions can also be loaded onto a computer, another programmable data processing device, or another equipment, so that a series of operation steps are executed on the computer, another programmable data processing device, or another equipment to produce a computer-realized process. According to process, the instructions can be executed on the computer, another programmable data processing device, or another equipment to realize a function/action specified in one or more blocks in a flowchart and/or block diagram of the present disclosure.

The flowcharts and block diagrams in the drawings show the possible implementation architecture, functions, and operations of the system, the method, and the computer program product according to the plurality of embodiments of the present disclosure. In this regard, each block in the flowcharts or block diagrams may represent a module, a program segment, or a part of an instruction. The module, the program segment, or the part of an instruction contains one or more executable instructions for realizing a specified logic function. In some alternative implementations, a function marked in the block may also occur in a different order from the order indicated in the drawings. For example, depending on a function involved, two consecutive blocks can actually be executed in parallel, or sometimes be executed in reverse order. It should also be noted that each block in the block diagrams and/or flowcharts, and the combination of the blocks in the block diagrams and/or flowcharts, can be implemented by a dedicated hardware-based system that performs a specified function or action, or can be realized by a combination of dedicated hardware and a computer instruction.

In the embodiments above, the description of each embodiment has its own emphasis. For a part that is not described in detail in one embodiment, reference may be made to related descriptions in other embodiments. Each technical features of the embodiments above can be randomly combined. For conciseness, not all possible combinations of the technical features of the embodiments above are described. Yet, provided that there is no contradiction, combinations of these technical features fall within the scope of the description of the present specification.

The foregoing can be better understood according to the following articles:

A1. A method for accessing a shared storage space, wherein, the method is applied to a first unit, wherein, the first unit is configured to access the shared storage space and is a processor or a core in a processor; the method comprises:

sending a write request to a shared memory, wherein, the write request carries an operator and a destination address to make the shared memory obtain an operand according to the destination address, use the operator to perform an operation on the operand to obtain an operation result, and write the operation result in the destination address.

A2. The method of A1, wherein, the write request further carries a read request identifier, wherein, the read request identifier is used to indicate that the first unit needs to obtain the operand, and the write request is further used to make the shared memory store the operand in the buffer after the shared memory obtains the operand.

A3. The method of A2, further comprising:

receiving a response signal which is returned by the shared memory in response to the write request, wherein, the response signal carries storage information of the operand in a buffer, and sending a read request to the shared memory according to the storage information, so as to access the buffer to obtain the operand.

4. A method for accessing a shared storage space, wherein, the method is applied to a shared memory and comprises:

receiving a write request, wherein, the write request carries an operator and a destination address; and obtaining an operand according to the destination address, using the operator to perform an operation on the operand to obtain an operation result, and writing the operation result to the destination address.

A5. The method of A4, further comprising:

if the write request also carries a read request identifier, storing the operand in a buffer after obtaining the operand, wherein, the read request identifier is used to indicate that a side by which the write request is sent needs to obtain the operand, and in response to the write request, returning a response signal, wherein, the response signal carries storage information of the operand in the buffer.

A6. The method of A5, further comprising:

receiving the read request, wherein, the read request carries the storage information of the operand in the buffer, and obtaining the operand according to the storage information, and returning the operand.

A7. A system comprising a first unit and a shared memory, wherein, the first unit is configured to access a shared storage space, the first unit is a processor or a core in a processor;

the first unit is configured to send a write request to the shared memory, wherein, the write request carries an operator and a destination address; and the shared memory is configured to receive the write request, obtain an operand according to the destination address, use the operator to perform an operation on the operand to obtain an operation result, and write the operation result in the destination address.

A8. The system of claim A7, further comprising a control unit, a shared storage space, and an operation unit, wherein, the control unit is connected to the shared storage space and the operation unit respectively.

A9. The system of A8, wherein, the control unit is configured to obtain the operand from the shared storage space according to the destination address after receiving the read request, the control unit is configured to send an operation instruction to the operation unit according to the operator and the operand, the operation unit is configured to use the operator to perform an operation on the operand to obtain an operation result, and send the operation result to the control unit, and the control unit is configured to write the operation result in the destination address.

A10. The system of claim A8, wherein, the write request further carries a read request identifier, wherein, the read request identifier is used to indicate that the first unit needs to obtain the operand, and the shared memory further includes a buffer which is connected to the control unit, the control unit is configured to store the operand in the buffer according to the read request after obtaining the operand, and the control unit is configured to send a response signal to the first unit after writing the operation result in the destination address, wherein the response signal carries storage information of the operand in the buffer.

A11. The system of claim A10, wherein, the first unit is configured to send a read request according to the storage information after receiving the response signal, and the control unit is configured to obtain the operand according to the storage information in response to the read request after receiving the read request, and return the operand to the first unit.

A12. A device for accessing a shared storage space, wherein, the device is applied to a first unit, wherein, the first unit is configured to access the shared storage space and is a processor or a core in processor, the device comprises:

a first sending module configured to send a write request to the shared memory, wherein the write request carries an operator and a destination address, so that the shared memory obtains an operand according to the destination address, uses the operator to perform an operation on the operand to obtain an operation result, and writes the operation result in the destination address.

A13. The device of A12, wherein, the write request further carries a read request identifier, wherein, the read request identifier is used to indicate that the first unit needs to obtain the operand, and the write request is further used to make the shared memory store the operand in a buffer after the shared memory obtains the operand.

A14. The device of A13, further comprising:
a first receiving module configured to receive a response signal which is returned by the shared memory in response to the write request, wherein, the response signal carries storage information of the operand in the buffer, and
a second sending module configured to send a read request to the shared memory according to the storage information, so as to access the buffer to obtain the operand.

A15. A device for accessing a shared storage space, wherein, the device is applied to a shared memory and comprises:
a second receiving module configured to receive a write request, wherein, the write request carries an operator and a destination address; and
an operation module configured to obtain an operand according to the destination address, use the operator to perform an operation on the operand to obtain an operation result, and write the operation result in the destination address.

A16. The device of A15, further comprising:
a storage module configured to, if the write request also carries a read request identifier, store the operand in a buffer after obtaining the operand, wherein the read request identifier is used to indicate that a side by which the write request is sent needs to obtain the operand, and
a responding module configured to return a response signal in response to the write request, wherein, the response signal carries the storage information of the operand in the buffer.

A17. The device of A16, further comprising:
a third receiving module configured to receive the read request, wherein, the read request carries the storage information of the operand in the buffer, and
a returning module configured to obtain the operand according to the storage information, and return the operand.

A18. An address allocation device comprising:
a processor; and
a memory configured to store a processor executable instruction, wherein,
the processor is configured to perform the method of any of A1 to A3 when the processor executes the instruction, or,
the processor is configured to perform the method of any of A4 to A6 when the processor executes the instruction.

A19. A non-volatile computer-readable storage medium, wherein, a computer program instruction is stored in the non-volatile computer-readable storage medium, and when the computer program instruction is executed by a processor, the computer program instruction implements the method of any of A1 to A3; or
when the computer program instruction is executed by a processor, the computer program instruction implements the method of any of A4 to A6.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change or transform the implementation and application scope according to the ideas of the present application. The changes and transformations shall all fall within the protection scope of the present disclosure. In summary, the content of this specification should not be construed as a limitation on the present disclosure.

What is claimed:
1. A method for accessing a shared storage space, comprising:
sending, by a processing circuit, a write request to a shared memory,
wherein the write request includes an operator and a destination address in the shared storage space,
wherein the write request prompts an operation circuit of the shared memory to:
retrieve an operand in accordance with the destination address,
store the operand in a buffer of the shared memory,
perform an operation in accordance with the operator on the operand to generate an operation result, and
write the operation result to the destination address, and
wherein the write request includes a read request indicator bit that indicates that the processing circuit requests the operand; and
receiving, by the processing circuit, a response signal from the shared memory in response to the write request, wherein the response signal includes an address of the operand in the buffer of the shared memory.

2. The method of claim 1, further comprising sending, by the processing circuit, a read request to the shared memory to access the operand stored in the buffer based on the received address included in the response signal.

3. The method of claim 1, wherein the processing circuit is a processor or a core in the processor.

4. A method for accessing a shared storage space, comprising:
receiving, by a shared memory, a write request that includes an operator and a destination address in the shared storage space from a processing circuit;
retrieving, by a control circuit of the shared memory, an operand from the destination address in the shared storage space, wherein the write request includes a read request indicator bit that indicates that the processing circuit requests the operand;
storing, by the control circuit of the shared memory, the operand in a buffer of the shared memory;
performing, by an operation circuit of the shared memory, an operation in accordance with the operator on the operand to generate an operation result; and
writing, by the control circuit of the shared memory, the operation result to the destination address.

5. The method of claim 4, further comprising transmitting, by the shared memory, a response signal in response to the write request.

6. The method of claim 5, wherein the response signal includes an address of the operand in the buffer of the shared memory.

7. The method of claim 6, further comprising receiving a read request from the processing circuit to access the operand stored in the buffer based on the address included in the response signal.

8. The method of claim 7, further comprising, in response to the read request, retrieving the operand stored in the buffer and transmitting the operand to the processing circuit.

9. A shared storage system, comprising:
a processing circuit configured to transmit a write request that includes an operator and a destination address in a shared storage space; and
a shared memory configured to:
receive the write request from the processing circuit,
retrieve an operand in accordance with the destination address, wherein the write request includes a read request indicator bit that indicates that the processing circuit requests the operand,
perform an operation in accordance with the operator on the operand to generate an operation result, and
write the operation result to the destination address.

10. The shared storage system of claim 9, wherein the processing circuit is a processor or a core in the processor.

11. The shared storage system of claim 9, wherein the shared memory includes a control circuit configured to retrieve the operand from the destination address in response to the write request.

12. The shared storage system of claim 11, wherein the control circuit is further configured to send instructions to an operation circuit of the shared memory based on the operator and the operand.

13. The shared storage system of claim 12, wherein the operation circuit is configured to perform the operation in accordance with the operator on the operand in response to the instructions from the control circuit to generate the operation result.

14. The shared storage system of claim 13, wherein the control circuit is further configured to store the operation result to the destination address.

15. The shared storage system of claim 11, wherein the control circuit is configured to store the operand in a buffer of the shared memory in response to the read request indicator bit in the write request.

16. The shared storage system of claim 15, wherein the control circuit is configured to:
generate a response signal that includes the address in the buffer that stores the operand, and
transmit the response signal to the processing circuit.

17. The shared storage system of claim 16, wherein the processing circuit is configured to transmit a read request to the shared memory to access the operand stored in the buffer based on the received address included in the response signal.

18. The shared storage system of claim 17, wherein the control circuit is configured to, in response to the read request, retrieve the operand stored in the buffer and transmit the operand to the processing circuit.

* * * * *